(12) United States Patent
Vierle et al.

(10) Patent No.: US 8,461,232 B2
(45) Date of Patent: Jun. 11, 2013

(54) DISPERSING AGENT CONTAINING COPOLYMER MIXTURE

(75) Inventors: Mario Vierle, Wasserburg (DE); Klaus Lorenz, Zangberg (DE); Silke Flakus, Ebersberg (DE); Petra Wagner, Trostberg (DE); Christian Scholz, Wald an der Alz (DE); Barbara Wimmer, Tacherting (DE); Manfred Bichler, Engelsberg (DE); Angelika Hartl, Emertsham (DE); Martin Winklbauer, Halsbach (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 13/132,971

(22) PCT Filed: Nov. 25, 2009

(86) PCT No.: PCT/EP2009/065785
§ 371 (c)(1),
(2), (4) Date: Oct. 14, 2011

(87) PCT Pub. No.: WO2010/076092
PCT Pub. Date: Jul. 8, 2010

(65) Prior Publication Data
US 2012/0041105 A1 Feb. 16, 2012

(30) Foreign Application Priority Data
Dec. 8, 2008 (EP) .................................. 08170966

(51) Int. Cl.
| | | |
|---|---|---|
| *C04B 28/02* | (2006.01) | |
| *C08J 3/02* | (2006.01) | |
| *C08K 3/20* | (2006.01) | |
| *C08L 39/04* | (2006.01) | |
| *C08L 33/14* | (2006.01) | |

(52) U.S. Cl.
USPC ............... 524/4; 524/501; 524/515; 525/203; 525/212; 525/231

(58) Field of Classification Search
USPC ............... 524/4, 501, 515; 525/203, 212, 231
See application file for complete search history.

(56) References Cited

U.S. PATENT DOCUMENTS

| | | | |
|---|---|---|---|
| 5,362,323 A | 11/1994 | Koyata et al. | |
| 6,140,440 A | 10/2000 | Kinoshita et al. | |
| 6,777,517 B1 | 8/2004 | Albrecht et al. | |
| 2007/0161724 A1 | 7/2007 | Moraru et al. | |
| 2012/0041104 A1* | 2/2012 | Lorenz et al. ............... | 524/3 |
| 2012/0041106 A1* | 2/2012 | Vierle et al. ................ | 524/5 |

FOREIGN PATENT DOCUMENTS

| | | |
|---|---|---|
| EP | 0 556 061 A1 | 8/1993 |
| EP | 0 924 174 A1 | 6/1999 |
| WO | WO 00/77058 A1 | 12/2000 |
| WO | WO 2005/075529 A2 | 8/2005 |

OTHER PUBLICATIONS

PCT/EP2009/065785—International Preliminary Report on Patentability, Jun. 14, 2011.
PCT/EP2009/065785—International Search Report, Mar. 17, 2010.
PCT/EP2009/065785—International Written Opinion, Mar. 17, 2010.

* cited by examiner

*Primary Examiner* — Nathan M Nutter
(74) *Attorney, Agent, or Firm* — Curatolo Sidoti Co., LPA; Joseph G. Curatolo; Salvatore A. Sidoti

(57) ABSTRACT

The invention relates to a polymer composition containing 3 to 90% by weight of a copolymer H and 3 to 90% by weight of a copolymer K, the copolymers H and K each having polyether macromonomer structural units and acid monomer structural units, which are present in the copolymers H and K in each case in a molar ratio of 1:20 to 1:1, and at least 20 mol % of all structural units of the copolymer H and at least 25 mol % of all structural units of the copolymer K being present in each case in the form of acid monomer structural units, at least 60 mol % of the polyether macromonomer structural units of the copolymer H being represented by the isoprenol polyether derivative structural units and at least 60 mol % of the polyether macromonomer structural units of the copolymer K being represented by the vinyloxy polyether derivative structural units.

19 Claims, No Drawings

DISPERSING AGENT CONTAINING COPOLYMER MIXTURE

CROSS REFERENCE TO RELATED APPLICATIONS

This application is a national stage application of International Application No. PCT/EP2009/065785, filed 25 Nov. 2009, which claims priority from European Patent Application Serial No. 08170966.9, filed 8 Dec. 2008, from which applications priority is claimed, and which are incorporated herein by reference.

The present invention relates to a polymer composition, a dispersant, the preparation of the polymer composition and of the dispersant and the use of the polymer composition.

It is known that admixtures in the form of dispersants are often added to aqueous slurries of powdery inorganic or organic substances, such as clays, silicate powder, chalk, carbon black, crushed rock and hydraulic binders, for improving their workability, i.e. kneadability, spreadability, sprayability, pumpability or flowability. Such admixtures are capable of preventing the formation of solid agglomerates, of dispersing particles which are already present and particles newly formed by hydration and in this way of improving the workability. This effect is utilized in particular in a targeted manner in the preparation of construction material mixtures which contain hydraulic binders, such as cement, lime, gypsum, hemihydrate or anhydrite.

In order to convert these construction material mixtures based on said binders into a ready-to-use workable form, as a rule substantially more mixing water is required than would be necessary for the subsequent hydration or hardening process. The proportion of cavities formed in the concrete article due to the excess, subsequently evaporating water leads to significantly poorer mechanical strengths and durability.

In order to reduce this excess proportion of water at a specified processing consistency and/or to improve the workability at a specified water/binder ratio, admixtures which are generally referred to as water reduction agents or superplasticizers are used. In particular, copolymers which are prepared by free radical copolymerization of acid monomers and/or acid derivative monomers with polyether macromonomers are used in practice as such agents.

WO 2005/075529 describes copolymers which, in addition to acid monomer structural units, have hydroxybutylvinylpolyethylene glycol structural units as polyether macromonomer structural units. Such copolymers are widely used as high-performance superplasticizers since they have excellent performance characteristics.

Although the copolymers described are to be regarded as economical high-performance superplasticizers, there continues to be an aspiration to improve further the quality and the cost-efficiency of the copolymers.

The object of the present invention is therefore to provide an economical dispersant for hydraulic binders, which is suitable in particular as a superplasticizer for concrete.

The achievement of this object is a polymer composition containing 3 to 90% by weight of a copolymer H and 3 to 90% by weight of a copolymer K, the copolymers H and K each having polyether macromonomer structural units and acid monomer structural units, which are present in the copolymers H and K in each case in a molar ratio of 1:20 to 1:1, and at least 20 mol % of all structural units of the copolymer H and at least 25 mol % of all structural units of the copolymer K being present in each case in the form of acid monomer structural units, at least 60 mol % of the polyether macromonomer structural units of the copolymer H being represented by the isoprenol polyether derivative structural unit α of the general formula (Ia)

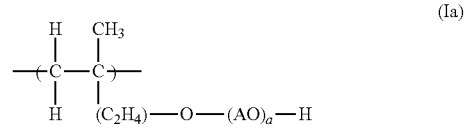

where
A are identical or different and are represented by an alkylene group according to $C_xH_{2x}$, where x=2, 3, 4 or 5, and
a are identical or different and are represented by an integer between 4 and 300,
at least 60 mol % of the polyether macromonomer structural units of the copolymer K being represented by the vinyloxy polyether derivative structural unit β of the general formula (Ib)

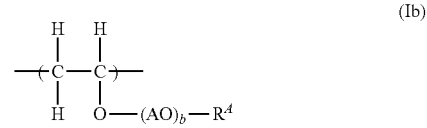

where $R^A$ are identical or different and are represented by a hydrogen atom, a linear or branched $C_1$-$C_{12}$ alkyl group, $C_5$-$C_8$ cycloalkyl group, phenyl group or $C_7$-$C_{12}$ arylalkyl group,
A are identical or different and are represented by an alkylene group according to $C_xH_{2x}$ where x=2, 3, 4 or 5, and
b are identical or different and are represented by an integer from 6 to 450,
the arithmetic mean of the alkylene groups A of the structural units which belong to the vinyloxy polyether derivative structural unit β being higher by at least the factor 1.5 than the arithmetic mean of the alkylene groups A of the structural units which belong to the isoprenol polyether derivative structural unit α.

The acid monomer structural units are produced by incorporating the corresponding acid monomers in the form of polymerized units. In this context, acid monomer is to be understood as meaning monomers which are capable of free radical copolymerization, have at least one carbon double bond, contain at least one acid function and react as an acid in an aqueous medium. Furthermore, acid monomer is also to be understood as meaning monomers which are capable of free radical copolymerization, have at least one carbon double bond, form at least one acid function as a result of a hydrolysis reaction in an aqueous medium and react as an acid in an aqueous medium (example: maleic anhydride or base-hydrolysable esters, such as ethyl acrylate). The polyether macromonomer structural units are produced by incorporating the corresponding polyether macromonomers in the form of polymerized units. In this connection, polyether macromonomers are, in the context of the present invention, compounds which are capable of free radical copolymerization and have at least one carbon double bond and which have ether oxygen atoms. The polyether macromonomer structural units present in the copolymer therefore have in each case at least one side chain which contains ether oxygen atoms.

In general, it may be said that the mode of action of relevant copolymers having polyether macromonomer structural units and acid structural units is determined by their structural parameters. The action spectrum of corresponding high-performance copolymers covers the entire range from extreme water reduction to extreme maintenance of consistency, structural parameters which ensure water reduction conflicting with good maintenance of consistency. Thus, in addition to the charge quantity per unit mass, the length of the side chains is also decisive, for example with regard to the water reduction capability. For the respective practical application, a "compromise" with regard to the choice of short and long side chains is frequently optimum, it having been recognized that mixtures of short and long side chains generally offer the best solution in this respect. The present invention realizes how such mixtures are provided economically and at high quality. The polyether macromonomer structural units of the copolymer K which are of the vinyloxy polyether type can, owing to the higher reactivity of the corresponding monomer, be more easily incorporated with long polyether side chains in the form of polymerized units (i.e. also more easily with a low residual monomer content) than comparatively the polyether macromonomer structural units of the copolymer H which are of the isoprenol polyether type. Copolymer K can therefore be prepared more easily in high quality with long polyether side chains than comparatively copolymer H. However, copolymer H can also be prepared relatively easily and effectively (with a low residual monomer content) with short side chains, corresponding monomers of the isoprenol polyether type being regarded as comparatively economically available starting materials. In summary, it may be said that the polymer composition according to the invention represents a high-quality and particularly economical dispersant for hydraulic binders.

In general, the polymer composition according to the invention contains 11 to 75% by weight of a copolymer H and 6 to 55% by weight of a copolymer K.

Preferably, at least 50 mol % of all structural units of the copolymer H and at least 50 mol % of all structural units of the copolymer K are present in each case in the form of acid monomer structural units.

As a rule, at least 85 mol % of the polyether macromonomer structural units of the copolymer H are represented by the isoprenol polyether derivative structural unit a of the general formula (Ia)

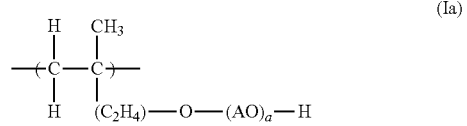

where

A are identical or different and are represented by an alkylene group according to $C_xH_{2x}$ where x=2, 3, 4 or 5, and a are identical or different and are represented by an integer between 5 and 39.

Typically, at least 85 mol % of the polyether macromonomer structural units of the copolymer K are represented by the vinyloxy polyether derivative structural unit β of the general formula (Ib)

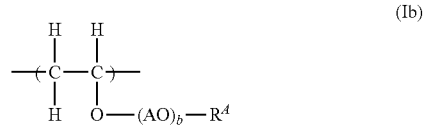

where $R^4$ are identical or different and are represented by a hydrogen atom, a linear or branched $C_1$-$C_{12}$ alkyl group, $C_5$-$C_8$ cycloalkyl group, phenyl group or $C_7$-$C_{12}$ arylalkyl group, A are identical or different and are represented by an alkylene group according to $C_xH_{2x}$ where x=2, 3, 4 or 5, and b are identical or different and are represented by an integer from 41 to 400.

Usually, the arithmetic mean of the alkylene groups A of the structural units which belong to the vinyloxy polyether derivative structural unit β is higher by at least a factor of 2 and the arithmetic mean of the alkylene groups A of the structural units which belong to the isoprenol polyether derivative structural unit α.

As a rule, the acid monomer structural units of the copolymers H and K are present in each case according to one of the general formulae (IIa), (IIb), (IIc) and/or (IId)

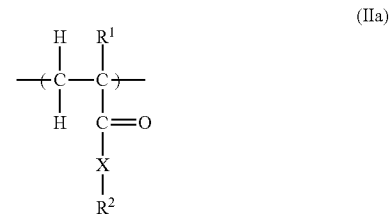

where $R^1$ are identical or different and are represented by H and/or a straight-chain or a branched $C_1$-$C_4$ alkyl group;

X are identical or different and are represented by NH—($C_nH_{2n}$) where n=1, 2, 3 or 4 and/or O—($C_nH_{2n}$) where n=1, 2, 3 or 4 and/or by a unit not present;

$R^2$ are identical or different and are represented by OH, $SO_3H$, $PO_3H_2$, O—$PO_3H_2$ and/or para-substituted $C_6H_4$—$SO_3H$, with the proviso that, if X is a unit not present, $R^2$ is represented by OH;

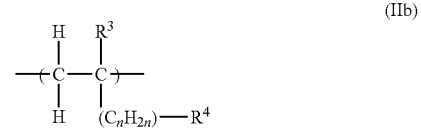

where $R^3$ are identical or different and are represented by H and/or a straight-chain or branched $C_1$-$C_4$ alkyl group;

n=0, 1, 2, 3 or 4;

$R^4$ are identical or different and are represented by $SO_3H$, $PO_3H_2$, O—$PO_3H_2$ and/or para-substituted $C_6H_4$—$SO_3H$;

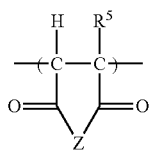

(IIc)

where
R⁵ are identical or different and are represented by H and/or a straight-chain or branched $C_1$-$C_4$ alkyl group;
Z are identical or different and are represented by O and/or NH;

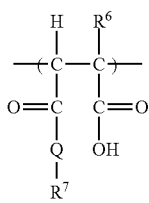

(IId)

where
R⁶ are identical or different and are represented by H and/or a straight-chain or branched $C_1$-$C_4$ alkyl group;
Q are identical or different and are represented by NH and/or O;
R⁷ are identical or different and are represented by H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ and/or $(C_mH_{2m})_e$—O-(A'O)$_\alpha$—R⁹ where m=0, 1, 2, 3 or 4, e=0, 1, 2, 3 or 4, A'=$C_xH_{2x'}$ where x'=2, 3, 4 or 5 and/or $CH_2C(C_6H_5)H$—, α=an integer from 1 to 350 with R⁹ identical or different and represented by a straight-chain or a branched $C_1$-$C_4$ alkyl group.

Frequently, the acid monomer structural units of the copolymers H and K are produced in each case by incorporation of the acid monomers methacrylic acid, acrylic acid, maleic acid, maleic anhydride and/or monoesters of maleic acid in the form of polymerized units.

Depending on the pH, the acid monomer structural units can also be present in deprotonated form as a salt, in which case typical counterions are $Na^+$, $K^+$ and $Ca^{2+}$.

Typically, the vinyloxypolyether derivative structural units β of the copolymer K are produced by incorporation of the alkoxylated hydroxybutyl vinyl ether, preferably having an arithmetic mean of oxyalkylene groups of 41 to 400, in the form of polymerized units.

The copolymers H and K may have in each case the same or different types of acid monomer structural units.

As a rule, in each case at least 45 mol %, preferably at least 80 mol %, of all structural units of the copolymers H and K are produced by incorporation of acid monomer and polyether macromonomer in the form of polymerized units.

The invention also relates to a dispersant containing at least 30% by weight of water and at least 10% by weight of the polymer composition described above. The dispersant is preferably present in the form of an aqueous solution.

Furthermore, the invention relates to a process for the preparation of the polymer composition according to the invention and of the dispersant according to the invention, in which the copolymers H and K are each prepared separately from one another in aqueous solution and the separately prepared copolymers or the separately prepared aqueous solutions are then mixed with one another. Normally, acid monomer and polyether macromonomer are reacted by free radical polymerization with the use of a peroxide-containing redox initiator system in aqueous solution, the temperature of the aqueous solution during the polymerization being 10 to 45° C. and the pH being 3.5 to 6.5.

Finally, the present invention also relates to the use of the polymer composition according to the invention as a dispersant for hydraulic binders and/or for latent hydraulic binders. The polymer composition according to the invention can also be used, for example (particularly in dewatered form), as an additive for cement production (grinding aid and "water reducer" for fine Portland cements or composite cements).

Below, the invention is to be explained in more detail with reference to working examples.

Polymer 1

400.0 g of deionized water and 450.0 g of vinyloxybutylpolyethylene glycol (adduct of 65 mol of ethylene oxide with 4-hydroxybutyl 1-monovinyl ether) were initially taken in a glass reactor—equipped with stirrer, pH electrode and a plurality of feeding devices—and cooled to a polymerization starting temperature of 15° C.

In a separate feed vessel, 29.2 g of acrylic acid were mixed with 84.3 g of deionized water and 15.4 g of a 40 weight % potassium hydroxide solution with cooling.

At the same time, a 6 weight % solution of Brüggolit® FF6 (commercial product from Brüggemann GmbH) in water was prepared (solution B).

43.4 ml of solution A, 3.5 ml of a 20 weight % aqueous sodium hydroxide solution and 0.5 g of 3-mercaptopropionic acid were dosed into the reactor with stirring and cooling.

0.9 g of 3-mercaptopropionic acid were added to the remaining solution A.

To start the reaction, 0.030 g of iron(II) sulphate heptahydrate and 1.9 g of hydrogen peroxide (30% in water) were successively added to the reactor. At the same time, the addition of solution A and solution B to the stirred initially taken mixture was begun. The rate of addition of solution A is shown in the dosing profile below.

| | t (min) | | | | | | |
|---|---|---|---|---|---|---|---|
| | 0 | 1.5 | 3 | 6 | 9 | 12 | 15 | 18 |
| Solution A (ml/h) | 55 | 110 | 193 | 231 | 215 | 193 | 165 | 132 |
| | t (min) | | | | | | |
| | 21 | 24 | 27 | 30 | 33 | 36 | 39 | 45 |
| Solution A (ml/h) | 105 | 82 | 66 | 49 | 40 | 28 | 24 | 0 |

Simultaneously with solution A, 20 weight % aqueous sodium hydroxide solution was dosed if required in order to prevent the pH of the reaction mixture from falling below 5.5.

Solution B was added over said period of 45 minutes at a constant dosing rate. After the end of the dosing of solution A, the dosing of solution B was continued until the reaction mixture was free of peroxide. The polymer solution obtained was then neutralized with 20 weight % sodium hydroxide solution (pH 6.5-7.0).

The resulting copolymer was obtained as a slightly yellowish solution and had a weight average molar mass of 64 000 g/mol; (determined by means of GPC).

SYNTHESIS EXAMPLE 2

125.0 g of deionized water and 137.5 g of vinyloxybutylpolyethylene glycol-1100 (adduct of 22 mol of ethylene oxide with 4-hydroxybutyl 1-monovinyl ether) and 62.5 g of vinyloxybutylpolyethylene glycol-500 (adduct of 10 mol of ethylene oxide with 4-hydroxybutyl 1-monovinyl ether) were initially taken in a glass reactor—equipped with stirrer, pH electrode and a plurality of feeding devices—and cooled to a polymerization starting temperature of 12° C.

In a separate feed vessel, 25.2 g of acrylic acid, 9.8 g of 2-hydroxypropyl acrylate and 12.5 g of a 40 weight % potassium hydroxide solution were homogeneously mixed with 101.8 g of deionized water with cooling. 2.4 g of 3-mercaptopropionic acid were then added (solution A).

At the same time, a 6 weight % solution of Brüggolit® FF6 (commercial product from Brüggemann GmbH) in water was prepared (solution B).

43.6 ml of solution A and then 12.2 g of a 20 weight % aqueous sodium hydroxide solution were added to the reactor.

After this, successively 0.0465 g of iron(II) sulphate heptahydrate was added and the reaction was started by adding 2.9 g of hydrogen peroxide (30% in water) to the initially taken mixture. At the same time, the addition of solution A and solution B to the stirred initially taken mixture was begun.

The rate of addition of the remaining solution A is shown in the dosing profile below.

| | T (min) | | | | | | | |
|---|---|---|---|---|---|---|---|---|
| | 0 | 1.5 | 3 | 6 | 9 | 12 | 15 | 18 |
| Solution A (ml/h) | 70 | 139 | 244 | 292 | 272 | 244 | 209 | 167 |
| | T (min) | | | | | | | |
| | 21 | 24 | 27 | 30 | 33 | 36 | 39 | 45 |
| Solution A (ml/h) | 132 | 103 | 83 | 62 | 50 | 35 | 31 | 0 |

The rate of addition of solution B was adjusted during the dosing of solution A to 18 ml. After the dosing of solution A, the dosing of solution B into the reactor was continued until the reaction mixture was free of peroxide.

During the reaction time, 20 weight % aqueous sodium hydroxide solution was added, if required, in order to keep the pH above 5.6.

The polymer solution obtained was then adjusted to a pH of 6.5 with 20 weight % sodium hydroxide solution.

The resulting copolymer was obtained in a slightly yellowish solution which had a solid content of 43.8%. The weight average molar mass of the copolymer was 23 000 g/mol; the total conversion (determined by means of GPC spectrum) was 94%.

SYNTHESIS EXAMPLE 3

87.0 g of deionized water and 82.5 g of isoprenol polyethylene glycol-1100 (adduct of 23 mol of ethylene oxide with 3-methylbut-3-en-1-ol) and 37.5 g of isoprenolpolyethylene glycol-500 (adduct of 10 mol of ethylene oxide with 3-methylbut-3-en-1-ol) were initially taken in a glass reactor—equipped with stirrer, pH electrode and a plurality of feeding devices—and cooled to a polymerization starting temperature of 15° C.

In a separate feed vessel, 16.2 g of acrylic acid, 5.9 g of 2-hydroxypropyl acrylate and 9.2 g of a 40 weight % potassium hydroxide solution were homogeneously mixed with 49.5 g of deionized water with cooling (solution A).

At the same time, a 6 weight % solution of Brüggolit® FF6 (commercial product from Brüggemann GmbH) in water was prepared (solution B).

27.5 ml of solution A, 1.1 g of 3-mercaptopropionic acid and then 0.5 g of a 20 weight % aqueous sodium hydroxide solution were then added to the reactor with stirring and cooling. 0.9 g of 3-mercaptopropionic acid was added to the remaining solution A.

After this, successively 0.0465 g of iron(II) sulphate heptahydrate was added and the reaction was started by adding 2.9 g of hydrogen peroxide (30% in water) to the initially taken mixture. At the same time, the addition of solution A and solution B to the stirred initially taken mixture was begun.

The rate of addition of the remaining solution A is shown in the dosing profile below.

| | T (min) | | | | | | | |
|---|---|---|---|---|---|---|---|---|
| | 0 | 1.5 | 3 | 6 | 9 | 12 | 15 | 18 |
| Solution A (ml/h) | 35.0 | 70.0 | 123 | 147 | 136 | 123 | 105 | 84 |
| | T (min) | | | | | | | |
| | 21 | 24 | 27 | 30 | 33 | 36 | 39 | 45 |
| Solution A (ml/h) | 67 | 52 | 42 | 31 | 25 | 18 | 16 | 0 |

The rate of addition of solution B was adjusted during the dosing of solution A to 27 ml/h. After the dosing of solution A, the dosing of solution B into the reactor was continued until the reaction mixture was free of peroxide.

During the reaction time, 20 weight % aqueous sodium hydroxide solution was added, if required, in order to keep the pH above 5.1.

The polymer solution obtained was then adjusted to a pH of 6.5 with 20 weight % sodium hydroxide solution.

The resulting copolymer was obtained in a slightly yellowish solution which had a solid content of 43.0%. The weight average molar mass of the copolymer was 28 000 g/mol; the total conversion (determined by means of GPC spectrum) was 94%.

Application Tests:

330 kg of Portland cement (CEM|42.5 R) and 30 kg of limestone powder was stirred with round aggregates having a composition according to the Fuller gradient curve with a maximum particle size of 16 mm and 152 kg of water which contained the products according to the invention or the comparative products in dissolved form. Immediately after the preparation of the concrete mix, the determination of the slump (according to DIN 12350-5) and of the change thereof as a function of time over a period of 60 minutes was effected.

The results of the test are shown in the table below.

| | | Slump in cm | | |
|---|---|---|---|---|
| Superplasticizers[1] | Dose[2] | 0 min | 10 min | 60 min |
| Polymer 1 | 0.13% | 59 | 40 | 37 |
| Polymer mixture 1a | 0.18% | 60 | 50 | 45 |
| Polymer mixture 1b | 0.18% | 60 | 49 | 44 |

[1]Polymer 1 = Polymer according to Synthesis Example 1; Polymer mixture 1a = physical mixture of polymer according to Synthesis Example 1 and polymer according to Synthesis Example 2, mixing ratio (quantitative ratio) 1:1; polymer mixture 1 b = physical mixture of polymer according to Synthesis Example 1 and polymer according to Synthesis Example 3, mixing ratio (quantitative ratio) 1:1
[2]Dose in % by weight of polymer solid, based on the initial weight of cement From the use examples, it is clear that the application properties of polymer mixture 1a and 1b are identical within the accuracy of measurement. Thus, polymer mixture 1b is a particularly economical dispersant since the polymer component according to Synthesis Example 3, used in polymer mixture 1b, contains economical isoprenol polyether macromonomer structural units. Owing to the identical application properties, this economic advantage is not reduced by a possible higher dose.

The invention claimed is:

1. Polymer composition containing 3 to 90% by weight of a copolymer H and 3 to 90% by weight of a copolymer K, the copolymers H and K each having polyether macromonomer structural units and acid monomer structural units, which are present in the copolymers H and K in each case in a molar ratio of 1:20 to 1:1, and at least 20 mol % of all structural units of the copolymer H and at least 25 mol % of all structural units of the copolymer K being present in each case in the form of acid monomer structural units, at least 60 mol % of the polyether macromonomer structural units of the copolymer H being represented by the isoprenol polyether derivative structural unit α of the general formula (Ia)

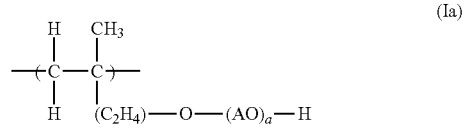
(Ia)

where
A are identical or different and are represented by an alkylene group according to $C_xH_{2x}$ where x=2, 3, 4 or 5, and
a are identical or different and are represented by an integer between 4 and 300, at least 60 mol % of the polyether macromonomer structural units of the copolymer K being represented by the vinyloxy polyether derivative structural unit β of the general formula (Ib)

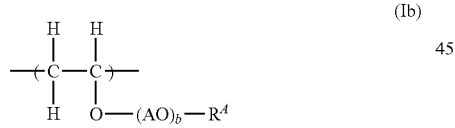
(Ib)

where $R^A$ are identical or different and are represented by a hydrogen atom, a linear $C_1$-$C_{12}$ alkyl group or branched $C_3$-$C_{12}$ alkyl group, $C_5$-$C_8$ cycloalkyl group, phenyl group or $C_7$-$C_{12}$ arylalkyl group,
A are identical or different and are represented by an alkylene group according to $C_xH_{2x}$ where x=2, 3, 4 or 5, and
b are identical or different and are represented by an integer from 6 to 450,
the arithmetic mean of the alkylene groups A of the structural units which belong to the vinyloxy polyether derivative structural unit β being higher by at least the factor 1.5 than the arithmetic mean of the alkylene groups A of the structural units which belong to the isoprenol polyether derivative structural unit α.

2. Polymer composition according to claim 1, containing 11 to 75% by weight of a copolymer H and 6 to 55% by weight of a copolymer K.

3. Polymer composition according to claim 1 wherein at least 50 mol % of all structural units of the copolymer H and at least 50 mol % of all structural units of the copolymer K are present in each case in the form of acid monomer structural units.

4. Polymer composition according to claim 1, wherein at least 85 mol % of polyether macromonomer structural units of copolymer H are represented by the isoprenol polyether derivatives structural unit α of the general formula (Ia)

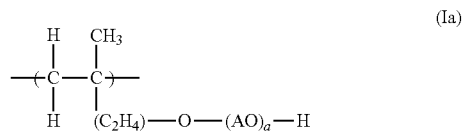
(Ia)

where
A are identical or different and are represented by an alkylene group according to $C_xH_{2x}$ where x=2, 3, 4 or 5, and
a are identical or different and are represented by an integer between 5 and 39.

5. Polymer composition according to claim 1, wherein at least 85 mol % of the polyether macromonomer structural units of the copolymer K are represented by the vinyloxy polyether derivative structural unit β of the general formula (Ib)

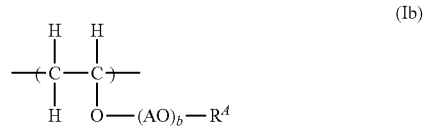
(Ib)

where
$R^A$ are identical or different and are represented by a hydrogen atom, a linear $C_1$-$C_{12}$ alkyl group or branched $C_3$-$C_{12}$ alkyl group, $C_5$-$C_8$ cycloalkyl group, phenyl group or $C_7$-$C_{12}$ arylalkyl group,
A are identical or different and are represented by an alkylene group according to $C_xH_{2x}$ where x=2, 3, 4 or 5, and
b are identical or different and are represented by an integer from 41 to 400.

6. Polymer composition according to claim 1, wherein the arithmetic mean of the alkylene groups A of the structural units which belong to the vinyloxy polyether derivative structural unit β is higher by at least the factor 2 than the arithmetic mean of the alkylene groups A of the structural units which belong to the isoprenol polyether derivative structural unit α.

7. Polymer composition according to claim 1, wherein the acid monomer structural units of the copolymers H and K are present in each case according to one of the general formulae (IIa), (IIb), (IIc) and/or (IId)

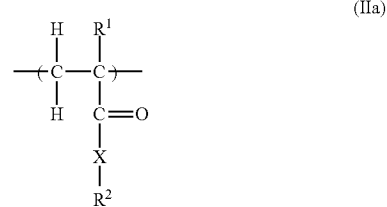
(IIa)

where
$R_1$ are identical or different and are represented by H and/or a straight-chain $C_1$-$C_4$ alkyl group or a branched $C_3$-$C_4$ alkyl group;

X are identical or different and are represented by NH—$(C_nH_{2n})$ where n=1, 2, 3 or 4 and/or O—$(C_nH_{2n})$ where n=1, 2, 3 or 4 and/or by a unit not present;

$R^2$ are identical or different and are represented by OH, $SO_3H$, $PO_3H_2$, O—$PO_3H_2$ and/or para-substituted $C_6H_4$—$SO_3H$, with the proviso that, if X is a unit not present, $R^2$ is represented by OH;

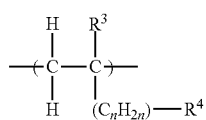
(IIb)

where
$R^3$ are identical or different and are represented by H and/or a straight-chain $C_1$-$C_4$ alkyl group or a branched $C_3$-$C_4$ alkyl group;
n=0, 1, 2, 3 or 4;
$R^4$ are identical or different and are represented by $SO_3H$, $PO_3H_2$, O—$PO_3H_2$ and/or para-substituted $C_6H_4$—$SO_3H$;

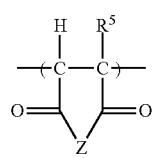
(IIc)

where
$R^5$ are identical or different and are represented by H and/or a straight-chain $C_1$-$C_4$ alkyl group or a branched $C_3$-$C_4$ alkyl group;
Z are identical or different and are represented by O and/or NH;

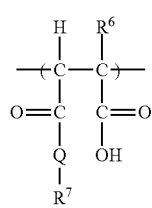
(IId)

where
$R^6$ are identical or different and are represented by H and/or a straight-chain $C_1$-$C_4$ alkyl group or a branched $C_3$-$C_4$ alkyl group;
Q are identical or different and are represented by NH and/or O;
$R^7$ are identical or different and are represented by H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ and/or $(C_mH_{2m})_e$—O—$(A'O)_\alpha$—$R^9$ where m=0, 1, 2, 3 or 4, e=0, 1, 2, 3 or 4, A'=$C_{x'}H_{2x'}$ where x'=2, 3, 4 or 5 and/or $CH_2C(C_6H_5)H$—, $\alpha$=an integer from 1 to 350 with $R^9$ identical or different and represented by a straight-chain $C_1$-$C_4$ alkyl group or a branched $C_3$-$C_4$ alkyl group.

8. Polymer composition according to claim 1, wherein the acid monomer structural units of the copolymers H and K are produced in each case by incorporation of the acid monomers methacrylic acid, acrylic acid, maleic acid, maleic anhydride and/or monoesters of maleic acid in the form of polymerized units.

9. Polymer composition according to claim 1, wherein the vinyloxy polyether derivative structural units β of the copolymer K are produced by incorporating in the form of polymerized units alkoxylated hydroxybutyl vinyl ether.

10. Polymer composition according to claim 1, wherein the copolymers H and K have in each case the same or different types of acid monomer structural units.

11. Polymer composition according to claim 1, wherein in each case at least 45 mol % of all structural units of the copolymers H and K are produced by incorporation of acid monomer and polyether macromonomer in the form of polymerized units.

12. A dispersant containing at least 30% by weight of water and at least 10% by weight of a polymer composition containing 3 to 90% by weight of a copolymer H and 3 to 90% by weight of a copolymer K, the copolymers H and K each having polyether macromonomer structural units and acid monomer structural units, which are present in the copolymers H and K in each case in a molar ratio of 1:20 to 1:1, and at least 20 mol % of all structural units of the copolymer H and at least 25 mol % of all structural units of the copolymer K being present in each case in the form of acid monomer structural units, at least 60 mol % of the polyether macromonomer structural units of the copolymer H being represented by the isoprenol polyether derivative structural unit a of the general formula (Ia)

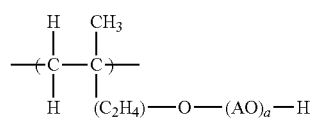
(Ia)

where
A are identical or different and are represented by an alkylene group according to $C_xH_{2x}$ where x=2, 3, 4 or 5, and
a are identical or different and are represented by an integer between 4 and 300, at least 60 mol % of the polyether macromonomer structural units of the copolymer K being represented by the vinyloxv polyether derivative structural unit β of the general formula (Ib)

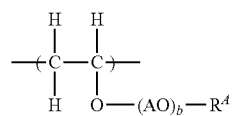
(Ib)

where $R^4$ are identical or different and are represented by a hydrogen atom, a linear $C_1$-$C_{12}$ alkyl group or branched $C_3$-$C_{12}$ alkyl group, cycloalkyl group, phenyl group or $C_7$-$C_{12}$ arylalkyl group, A are identical or different and are represented by an alkylene group according to $C_xH_{2x}$ where x=2, 3, 4 or 5, and b are identical or different and are represented by an integer from 6 to 450, the arithmetic mean of the alkylene groups A of the structural units which belong to the vinyloxy polyether derivative structural unit β being higher by at least the factor 1.5 than the arithmetic mean of the alkylene groups A of the structural units which belong to the isoprenol polyether derivative structural unit α.

13. Dispersant according to claim 12, which is present in the form of an aqueous solution.

14. Process for the preparation of a polymer composition containing 3 to 90% by weight of a copolymer H and 3 to 90% by weight of a copolymer K, the copolymers H and K each having polyether macromonomer structural units and acid monomer structural units, which are present in the copolymers H and K in each case in a molar ratio of 1:20 to 1:1, and at least 20 mol % of all structural units of the copolymer H and at least 25 mol % of all structural units of the copolymer K being present in each case in the form of acid monomer structural units, at least 60 mol % of the polyether macromonomer structural units of the copolymer H being represented by the isoprenol polyether derivative structural unit a of the general formula (Ia)

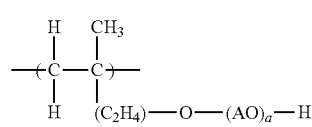
(Ia)

where

A are identical or different and are represented by an alkylene group according to $C_xH_{2x}$ where x=2, 3, 4 or 5, and a are identical or different and are represented by an integer between 4 and 300, at least 60 mol % of the polyether macromonomer structural units of the copolymer K being represented by the vinyloxy polyether derivative structural unit β of the general formula (Ib)

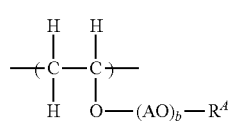
(Ib)

where $R^4$ are identical or different and are represented by a hydrogen atom, a linear $C_1$-$C_{12}$ alkyl group or branched $C_3$-$C_{12}$ alkyl group, $C_5$-$C_8$ cycloalkyl group, phenyl group or $C_7$-$C_{12}$ arylalkyl group, A are identical or different and are represented by an alkylene group according to $C_xH_{2x}$ where x=2, 3, 4 or 5, and b are identical or different and are represented by an integer from 6 to 450, the arithmetic mean of the alkylene groups A of the structural units which belong to the vinyloxy polyether derivative structural unit β being higher by at least the factor 1.5 than the arithmetic mean of the alkylene groups A of the structural units which belong to the isoprenol polyether derivative structural unit α, wherein the copolymers H and K are each prepared separately from one another in aqueous solution and the separately prepared copolymers or the separately prepared aqueous solutions are then mixed with one another.

15. Process according to claim 14, wherein acid monomer and polyether macromonomer are reacted by free radical polymerization with the use of a peroxide-containing redox initiator system in aqueous solution, the temperature of the aqueous solution during the polymerization being 10 to 45°C and the pH being 3.5 to 6.5.

16. Process of use of a polymer composition containing 3 to 90% by weight of a copolymer H and 3 to 90% by weight of a copolymer K, the copolymers H and K each having polyether macromonomer structural units and acid monomer structural units, which are present in the copolymers H and K in each case in a molar ratio of 1:20 to 1:1, and at least 20 mol % of all structural units of the copolymer H and at least 25 mol % of all structural units of the copolymer K being present in each case in the form of acid monomer structural units, at least 60 mol % of the polyether macromonomer structural units of the copolymer H being represented by the isoprenol polyether derivative structural unit α of the general formula (Ia)

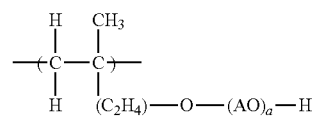
(Ia)

where

A are identical or different and are represented by an alkylene group according to $C_xH_{2x}$ where x=2, 3, 4 or 5, and a are identical or different and are represented by an integer between 4 and 300, at least 60 mol % of the polyether macromonomer structural units of the copolymer K being represented by the vinyloxy polyether derivative structural unit β of the general formula (Ib)

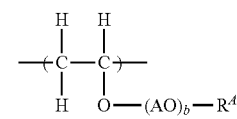
(Ib)

where $R^4$ are identical or different and are represented by a hydrogen atom, a linear $C_1$-$C_{12}$ alkyl group or branched $C_3$-$C_{12}$ alkly group, $C_5$-$C_8$ cycloalkyl group, phenyl group or $C_7$-$C_{12}$ arylalkyl group, A are identical or different and are represented by an alkylene group according to $C_xH_{2x}$ where x =2, 3, 4 or 5, and b are identical or different and are represented by an integer from 6 to 450, the arithmetic mean of the alkylene groups A of the structural units which belong to the vinyloxy polyether derivative structural unit β being higher by at least the factor 1.5 than the arithmetic mean of the alkylene groups A of the structural units which belong to the isoprenol polyether derivative structural unit α;

comprising adding the polymer composition as a dispersant to an aqueous slurry of hydraulic binder and/or of latent hydraulic binder.

17. Process for the preparation of a dispersant according to claim 12, wherein the copolymers H and K are each prepared separately from one another in aqueous solution and the separately prepared copolymers or the separately prepared aqueous solutions are then mixed with one another.

18. Polymer composition according to claim 1, wherein in each case at least 80 mol % of all structural units of the copolymers H and K are produced by incorporation of acid monomer and polyether macromonomer in the form of polymerized units.

19. Polymer composition according to claim 1, wherein the vinyloxy polyether derivative structural units β of the copolymer K are produced by incorporating in the form of polymerized units alkoxylated hydroxybutyl vinyl ether having an arithmetic mean of oxyalkylene groups of 41 to 400.

* * * * *